United States Patent
Sanders et al.

(10) Patent No.: US 7,610,818 B2
(45) Date of Patent: Nov. 3, 2009

(54) FLOW METER FOR BITUMEN FROTH PIPELINES

(75) Inventors: Sean R. Sanders, Edmonton (CA); Jason Schaan, Edmonton (CA)

(73) Assignee: Syncrude Canada Ltd., Fort McMurray (CA)

(*) Notice: Subject to any disclaimer, the term of this patent is extended or adjusted under 35 U.S.C. 154(b) by 0 days.

(21) Appl. No.: 11/539,053

(22) Filed: Oct. 5, 2006

(65) Prior Publication Data
US 2008/0110281 A1    May 15, 2008

(51) Int. Cl.
*G01F 1/44* (2006.01)
(52) U.S. Cl. .................................................. 73/861.63
(58) Field of Classification Search ............. 73/861.63, 73/861.64, 756, 861.52, 861.42, 706, 716; 392/468
See application file for complete search history.

(56) References Cited

U.S. PATENT DOCUMENTS

| | | | |
|---|---|---|---|
| 4,165,361 A * | 8/1979 | Milstein ..................... | 117/217 |
| 4,165,631 A * | 8/1979 | Boinet et al. ................ | 73/54.01 |
| 4,644,800 A | 2/1987 | Kozlak | |
| 4,651,572 A * | 3/1987 | Albertz et al. ............ | 73/861.63 |
| 4,829,831 A | 5/1989 | Kefer et al. | |
| 4,856,344 A | 8/1989 | Hunt | |
| 5,880,378 A | 3/1999 | Behring, II | |
| 5,933,574 A * | 8/1999 | Avansino ..................... | 392/468 |
| 6,171,025 B1 * | 1/2001 | Langner et al. .......... | 405/154.1 |

FOREIGN PATENT DOCUMENTS

EP    0234747    3/1991

* cited by examiner

*Primary Examiner*—Jewel Thompson
(74) *Attorney, Agent, or Firm*—Bennett Jones LLP

(57) ABSTRACT

A method and apparatus for measuring the flow rate of bitumen froth through a pipeline is provided. A flow meter device is provided including a conduit comprising an approach section having a diameter less than the diameter of the pipeline and a venturi section having in series a converging section, a throat section and, optionally, a diverging section, the converging section of the venturi section being disposed relative to the approach section, and a means for measuring the pressure difference ΔP between two points that are separate from one another in the flow direction, one point being on the approach section and the other point being on the throat section. In one embodiment, a heating means for heating the conduit is provided.

26 Claims, 5 Drawing Sheets

FLOW METER FOR BITUMEN FROTH PIPELINES

The present invention relates generally to a method and apparatus for measuring the flow rate of bitumen froth along a pipeline.

BACKGROUND OF THE INVENTION

Oil sand, such as is mined in the Fort McMurray region of Alberta, generally comprises water-wet sand grains held together by a matrix of viscous bitumen. It lends itself to liberation of the sand grains from the bitumen, preferably by slurrying the oil sand in heated process water, allowing the bitumen to move to the aqueous phase. The oil sand slurry thus formed is further conditioned, for example, in a pipeline, so that the bitumen coalesces and attaches to air bubbles, thereby forming a bitumen froth that can be separated from the sand in a separator such as a gravity separator or cyclonic separator.

The bitumen froth that is produced from oil sands routinely contains about 20-40% by volume dispersed water in which colloidal clay particles are well dispersed. Such an oil-water mixture is very stable and very viscous, having viscosities even higher than the oil alone. Further, the bitumen froth is non-conducting and the density of the bitumen is nearly identical to the density of the water.

Often, however, the formation of the bitumen froth may be at sites far removed from the upgrading facilities. Hence, the bitumen froth may need to be pumped through a relatively large inner diameter pipeline (e.g., 36 inches in diameter) over long distances (often in the order of 35 km) so that the froth can be further upgraded at the existing upgrading facilities. The aforementioned characteristics of the bitumen froth, however, present challenges in transporting such a viscous material through a pipeline. Pumping the bitumen froth under conditions of core-annular flow through the pipeline helps in the transport of bitumen froth. Core-annular flow can be achieved by introducing a less viscous immiscible fluid such as water into the flow of oil, to act as a lubricating layer between the pipe wall and the oil, or it can be achieved naturally as a result of the water already present in the bitumen froth (often referred to as self-lubricating core annular flow).

However, the nature of the bitumen froth and the nature of the flow regime pose problems when trying to accurately measure the flow rate of the bitumen froth through the large diameter pipelines using commercially available flow measuring devices or flow meters. Accurate flow rate measurements are important to provide input for the leak detection system employed when monitoring such pipelines. One of the major problems encountered is that bitumen tends to accumulate on the walls of the flow meter during froth flows, in particular, when the bulk pipeline is being operated at relatively low velocity.

Hence, conventional flow meters such as standard venturi meters fail to give accurate flow readings when testing these larger diameter pipelines used for transporting the bitumen froth. Other conventional meters such as electromagnetic and ultrasonic meters fail to give accurate flow readings due to properties of the bitumen itself or the flow regime. Thus, there is a need to develop a flow meter that can be used to measure the flow of bitumen froth through a larger diameter pipeline.

The present invention is directed towards a venturi type meter that has been designed to minimize the accumulation of bitumen on the walls of the meter and improve the accuracy of flow rate measurements of bitumen froth through a pipeline.

SUMMARY OF THE INVENTION

In one aspect of the invention, a method for measuring the flow rate of bitumen froth having a certain temperature through a pipeline having an inner diameter is provided, having the following steps:

providing a conduit comprising an approach section having an inner diameter less than the inner diameter of the pipeline and a venturi section having in series a converging section and a throat section, the converging section of the venturi section being disposed relative to the approach section and the throat section having an inner diameter less than the inner diameter of the approach section;

inserting the conduit into the pipeline or between two pieces of pipe comprising the pipeline;

heating at least a portion of the conduit to a temperature of about the temperature of the bitumen froth or higher;

allowing the bitumen froth to flow through the pipeline and through the heated conduit; and measuring the pressure difference $\Delta P$ between two points that are separate from one another in the flow direction, one point being on the approach section and the other point being on the throat section, to calculate the flow rate in the pipeline.

In one embodiment, the venturi section of the conduit further has a diverging section being disposed relative to the throat section.

In one embodiment, the conduit may be heated by encasing at least a portion of it in an insulated heat-exchanging pipeline jacket. In another embodiment, the conduit is heated by wrapping electrical heat tracing and insulation around at least the venturi section. In a preferred embodiment, the insulated heat-exchange jacket or electrical heat tracing and insulation extends from a point at least one times the diameter of the approach section upstream of the point of measurement of P in the approach to the downstream end of the venturi section.

In another embodiment, when the conduit is inserted into the pipeline, the conduit may be heated by heating the pipeline walls surrounding the conduit. In this embodiment, the pipeline walls may be heated, for example, by a heating jacket.

In one embodiment, the conduit is heated to a temperature in the range of about 35° C. to about 75° C. In another embodiment, the conduit is heated to a temperature in the range of about 50° C. to about 75° C.

In one embodiment, the diameter of the approach section is such that the bitumen froth velocity in the approach section is 1 m/sec or greater, preferable 2 m/sec or greater. In another embodiment, the ratio of the diameter of the throat section to the diameter of the approach section is about 0.7, which is a standard ratio for classical venturi meters. In another embodiment, the length of the approach section is about ten times the inner diameter of the approach section.

In another aspect of the invention, a flow meter device for measuring the flow rate of bitumen froth through a pipeline having an inner diameter is provided, having:

a conduit comprising an approach section having an inner diameter less than the inner diameter of the pipeline and a venturi section having in series a converging section and a throat section, the converging section being disposed relative to the approach section and the throat section having an inner diameter less than the inner diameter of the approach section; and a means for measuring the pressure difference $\Delta P$ between two points that are separate from one another in the flow direction, one point being on the approach section and the other point being on the throat section, whereby the pressure difference ΔP correlates to the flow rate in the pipeline.

In one embodiment, the venturi section of the conduit further has a diverging section being disposed relative to the throat section.

In another embodiment, the flow meter further has a means for heating the conduit. In one embodiment, the means for heating the conduit comprises an insulated heat-exchanging jacket for encasing at least a portion of the conduit. In another embodiment, the means for heating the conduit comprises electrical heat tracing and insulation wrapped around at least a portion of the conduit. Preferably, the insulated heat-exchange jacket or electrical heat tracing and insulation covers at least the venturi section.

In one embodiment, the inner diameter of the approach section is such that the bitumen froth velocity in the approach section is at least 1 m/sec, preferably at least 2 m/sec. In another embodiment, the length of the approach section is about ten times the inner diameter of the approach section.

In another embodiment, the ratio of the inner diameter of the throat section to the inner diameter of the approach section is about 0.7.

Both the reduced diameter approach section, relative to the diameter of the pipeline, and the means for heating the conduit contribute to minimize the accumulation of bitumen on the walls of the flow meter and thus improve accuracy. Without being bound to theory, the reduced diameter approach section produces high superficial velocities through the flow meter even if the velocities in the main pipeline are low. Further, the benefit of heating the conduit is that there will be a more consistent venturi performance obtained over a wide range of operating velocities. Ultimately, greater flow measurement accuracy can be obtained at lower operating velocities than is possible using conventional flow meters.

DESCRIPTION OF THE PREFERRED EMBODIMENT

Figure 1:
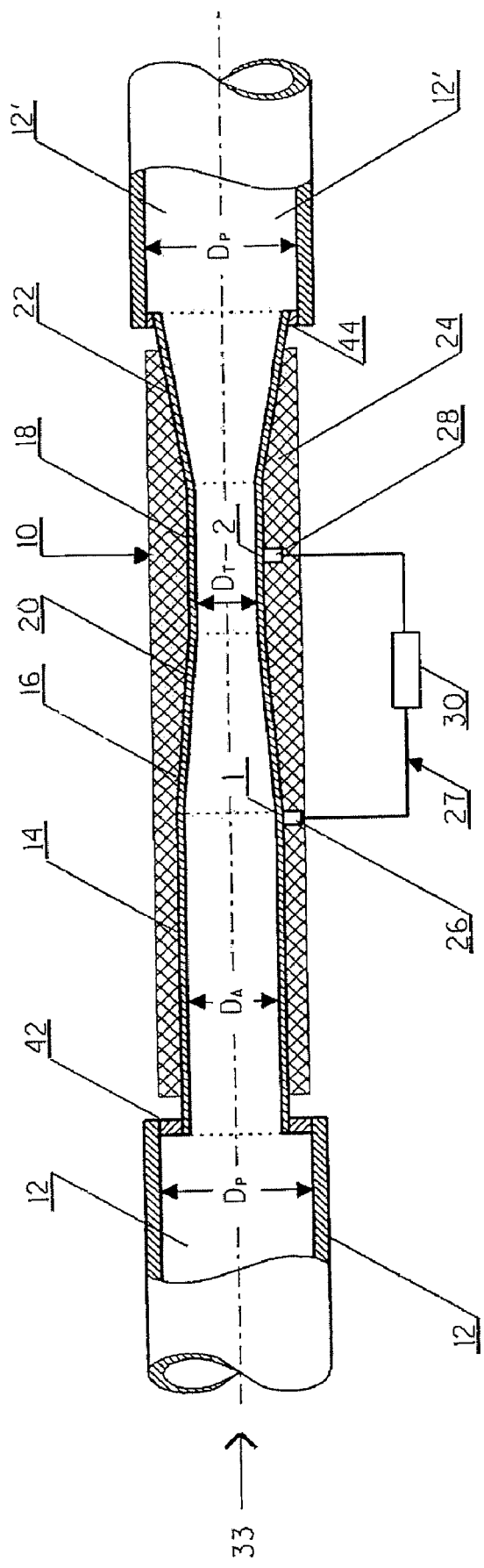
FIG. 1 shows one embodiment of a flow meter device of the invention.

In commercial operation at the applicants' Aurora plant, bitumen froth is routinely produced having an average froth quality of about 60% by mass bitumen, about 30% by mass water and about 10% by mass solids. The bitumen froth generally has a water content sufficient to obtain core annular flow of the froth. The temperature of the bitumen froth can vary, however, on average the froth temperature is about 40° C. to about 65° C., preferably around 50° C.

As mentioned, the bitumen froth routinely is pumped through a pipeline for significant distances to get to the refining plants. Thus, it is important to be able to monitor the flow rate of the bitumen froth at various points on the pipeline for quality control purposes. However, the velocity used to transport the bitumen froth in bulk pipelines is often relatively low so that the bitumen will have a tendency to accumulate around the inside walls of conventional flow meters. One way to minimize the accumulation of bitumen and keep it at a "constant" thickness would be to increase the velocity through the flow meter without having to increase the overall velocity of the bitumen froth through the pipeline.

The classical Venturi tube (also known as the Herschel Venturi tube), comprising in series a converging section, a narrow throat section and, optionally, a diverging section, is used in a classical venturi flow meter and such meter is routinely used to determine flow rate through a pipeline. It operates to measure the flow rate in a pipe by measuring the differential pressure, or pressure difference ΔP, between the pressure measured at the approach section, which is the portion of the pipe directly upstream of venturi, and at the throat section of the venturi (having an inner diameter considerably less than the approach section, i.e., pipe). In standard venturi meter applications used to measure turbulent flows of water or water-based slurries, the pressure drop measured between the approach section and the throat section of the venturi is related to the superficial velocity through the throat of the meter by a constant known as the "venturi coefficient" ($C_v$). This coefficient does not vary with flow rate at high Reynolds numbers. Thus, if the flow meter is working properly, the $C_v$ will always be a constant approaching 1 (e.g., ideally about 0.98 for pipe diameters of 2 to 8 inches and about 0.99 for larger sizes).

It was discovered, however, that when pumping viscous bitumen froth through a pipeline, both the temperature of the bitumen froth and the flow rate of the bitumen froth through the pipeline affected build up of bitumen in the venturi section of conventional venturi meters. When bitumen builds up in the venturi section, the ratio of the throat inner diameter to the approach inner diameter is constantly changing. Thus, under routine pipeline conditions for pumping bitumen froth, when bitumen froth flows through a standard venturi, the $C_v$ is constantly changing, making accurate flow readings very difficult. Therefore, in the present invention a conventional venturi flow meter was redesigned to compensate for one or both of these variables to provide reliable and accurate flow.

FIG. 1 shows one embodiment of a flow meter device of the invention. In this embodiment, the flow meter 10 is shown inserted between pipe 12 and pipe 12', which pipe forms part of the pipeline, for the purpose of measuring flow therethrough. It is understood that the inner diameter of pipe 12 and 12' ($D_P$) can vary; in this embodiment of flow meter, the inner diameter of the pipeline (i.e., pipe 12 and 12') is about 20". Flow meter is attached at each end to pipe pieces 12 and 12' by coupling means 42 and 44, respectively, as known in the art, for example, flange couplings, victaulic couplings and the like.

Flow meter 10 is comprised of a conduit 20 with an approach section 14 at its upstream end having an inner diameter ($D_A$) less than the inner diameter ($D_P$) of the pipe 12. In this embodiment, $D_A$ is about 13 inches, when installed on the 20" pipeline. Thereafter, the walls of the conduit 20 converge, forming converging section 16. Following converging section 16, the walls of conduit 20 extend substantially parallel to its longitudinal axis, forming a throat section 18 having an inner diameter ($D_T$) less than the inner diameter $D_A$ of the approach section 14. In this embodiment, $D_T$ is about 10 inches. Finally, the walls of conduit 20 diverge from throat section 18 to form a diverging section 22.

Flow meter 10 further comprises a heating jacket 24, which in this embodiment essentially surrounds the entire length and circumference of conduit 20. This ensures that both the approach section 14 and the throat section 18 are heated. The heating jacket may be heated by circulating heated water therethrough.

A differential pressure transducer 27, such as is readily commercially available, is provided to measure the differential pressure ("psid") between two pressure ports. It is understood that the differential pressure transducer hooks up capillaries to the two ports and measures the difference across a single diaphragm, as is standard in the industry. As shown in FIG. 1, two pressure ports are disposed on conduit 12. In particular, pressure port 26 is located at point 1, which point is situated at or near the outlet of approach section 14, and pressure port 28 is located at point 2, which point is situated along the length of the throat section 18.

In practice, the bitumen froth, shown flowing in the direction represented by arrow 33, first passes through approach section 14, then through converging section 16 and then through throat section 18. A differential pressure sensor 30 serves to measure the pressure difference between the two pressure takeoff points 1 and 2 located on the approach section and venturi section, respectively. The means for heating the conduit heats the flow meter to a temperature of about the temperature of the bitumen froth or greater.

Figure 2:
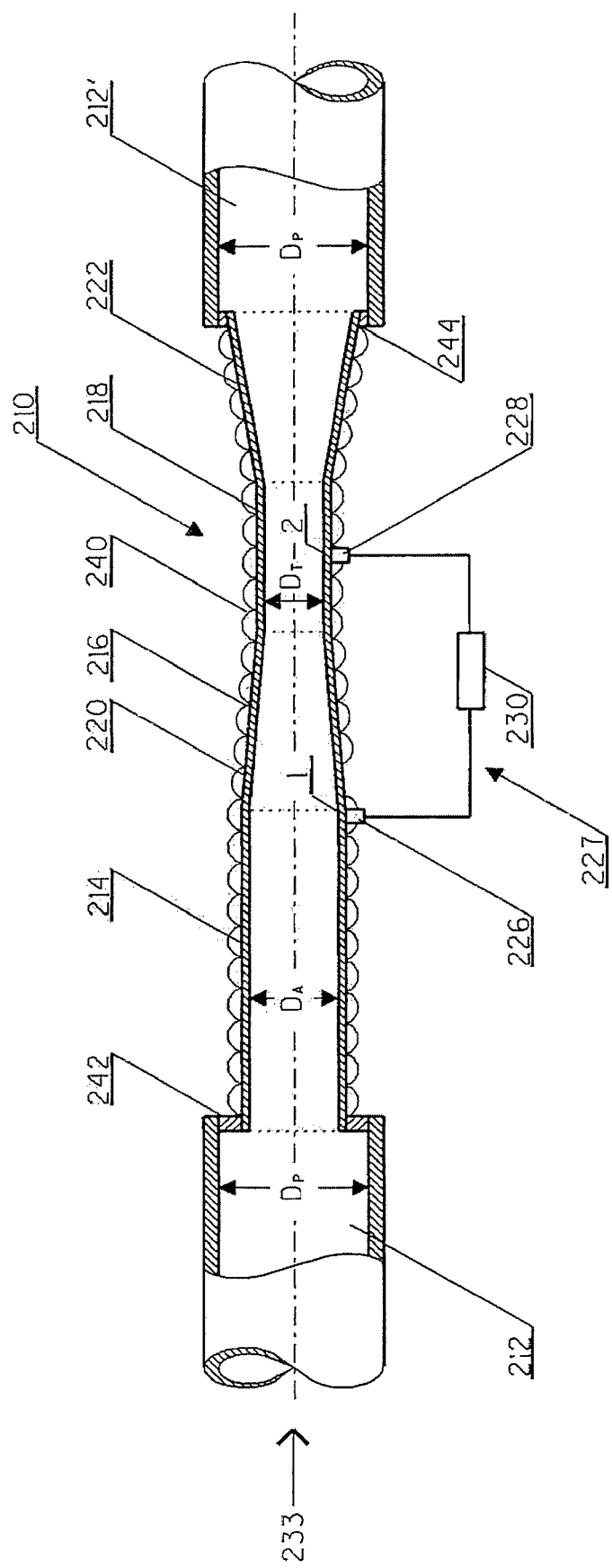
FIG. 2 shows another embodiment of a flow meter device of the invention.

FIG. 2 illustrates another embodiment of a flow meter device of the invention. In this instance, flow meter 210 is shown connected at each of its ends by coupling means 242 and 244 as known in the art to pipe 212 and 212', respectively. In this embodiment, flow meter 210 comprises conduit 220 having an approach section 214, a converging section 216, a throat section 218 and a diverging section 222. Flow meter 210 further comprises electrical heat tracing and insulation 240 wrapped around the entire length of conduit 220. This ensures that both the approach section 214 and the throat section 218 are heated. It is understood that the electric heat tracing and insulation may only need to be wrapped around part of conduit 220 and still provide sufficient heat to flow meter 210 for it to operate.

Differential pressure transducer 227 comprises pressure ports 226 and 228 located at points 1 and 2, respectively. The bitumen froth, e.g. flowing in the direction represented by arrow 233, first passes through approach section 214, then through converging section 216 and then through throat section 218. A differential pressure sensor 230 serves to measure the pressure difference between the two pressure takeoff points 1 and 2.

Figure 3:
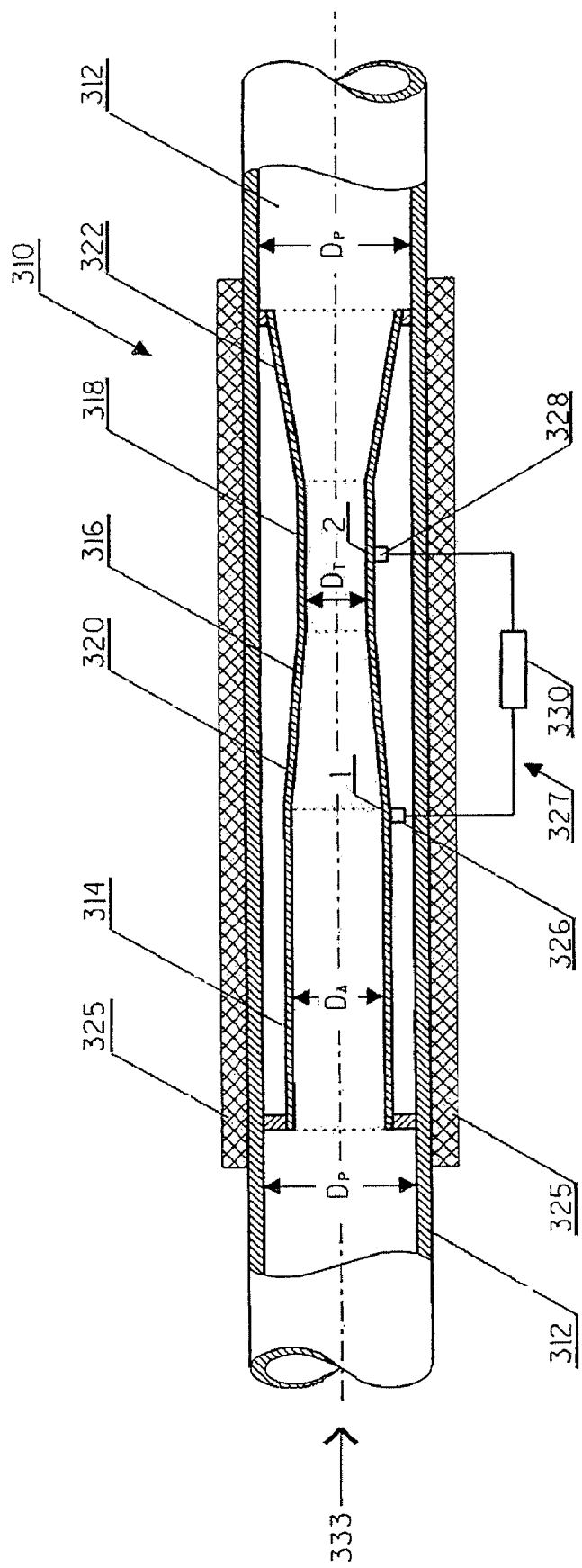
FIG. 3 shows yet another embodiment of a flow meter device of the invention.

In another embodiment of the invention shown in FIG. 3, a flow meter 310 is provided comprising conduit 320 having an approach section 314, a converging section 316, a throat section 318 and a diverging section 322. In this embodiment, flow meter 310 is situated within one or more pieces of pipe of pipeline 312. Flow meter 310 is heated by wrapping the pipe 312 with a heating jacket 325, which in this embodiment essentially surrounds the pipeline 312 to cover the area of the pipeline containing the flow meter 310. It is understood that the pipeline may only need to be partially covered to still provide sufficient heat to flow meter 310 for it to operate, depending on the type of heating jacket used. It is further understood that other means for heating pipe known in the art can also be used.

Differential pressure transducer 327 comprises pressure ports 326 and 328 located at points 1 and 2, respectively. A differential pressure sensor 330 serves to measure the pressure difference between the two pressure takeoff points 1 and 2.

It was discovered that two factors played significant roles in bitumen accumulation on the walls of a venturi meter, namely, the velocity of the bitumen froth through the pipeline, and, hence, the superficial velocity through the venturi meter, and the temperatures of the bitumen froth through the venturi meter, and the wall of the venturi meter.

Controlled laboratory tests were conducted with a pipeline having an inner diameter of either 154 mm or 100 mm and a length of approximately 90 meters to study each of these parameters. Bitumen froth was pumped from a 15 $m^3$ reservoir into the pipeline and the venturi meters of the present invention were installed in the pipeline. A single stage progressive cavity pump (Moyno 1J175), a 75 kW (100 HP) motor, and a variable frequency drive were used to produce flow in these experiments. The volumetric discharge rate of the pump was calibrated against its rotational speed so that the pump speed could be used to determine the flow rate of the bitumen froth. To verify the pump speed versus flow rate relationship for bitumen froth, "bucket-and-stopwatch" calibration tests were conducted (to determine volume per time). These bucket and stopwatch calibrations are referred to herein as the velocity (V) of the pipeline.

Two different meter conduits were tested in the following experiments: one having an approach section of 103.6 mm in diameter and a throat section of 63.0 mm in diameter (the 104 mm meter) and one having an approach section of 78.0 mm in diameter and a throat section of 51.3 mm in diameter (the 78 mm meter). Electronic pressure transducers were used to measure pressure drop across the meter.

A heat exchange jacket was provided to achieve the meter temperature of interest. Hot water was pumped counter-currently through the heat exchange jackets and temperature probes were located at the inlet and discharge of the heat jacket to ensure that a stable temperature developed across the exchanger.

EXAMPLE 1

Effect of the Velocity in the Approach Section

Tests were first conducted using the 104 mm meter. In these tests, both the pipeline inner diameter and approach section inner diameter were the same (both about 100 mm), thereby mimicking a classical venturi meter having an approach section equal in diameter to the pipeline diameter. In this instance, the velocity of the bitumen froth through the pipeline and through the approach section would be virtually identical.

Prior to conducting the bitumen froth tests, the venturi discharge coefficient for the 10 mm meter was determined for water flow and found to be 0.974. Venturi discharge coefficients measured for water were independent of flow rate. Two different bitumen froth preparations having different froth qualities were tested. Froth quality is measured as % by mass bitumen/water/solids (B/W/S). Bitumen froth A had a froth quality of 59/31/10 and bitumen froth B had a froth quality of 63/27/10. Froth temperature for both A and B was 50° C.

The venturi coefficients ($C_v$) were determined for each froth preparation at four different froth velocities: 0.2 m/sec, 0.4 m/sec, 0.6 m/sec and 0.8 m/sec using the following equation, which relates the approach section velocity and the pressure drop in a horizontal meter:

$$V_{app} = \beta^2 C_V \sqrt{\frac{2(-\Delta P)}{\rho(1-\beta^4)}}$$

where $C_v$ is the discharge coefficient for the meter, $\beta$ is the ratio of the throat diameter to the approach diameter and $\rho$ is the density of the fluid (e.g., bitumen froth) (kg/m³).

Figure 4:
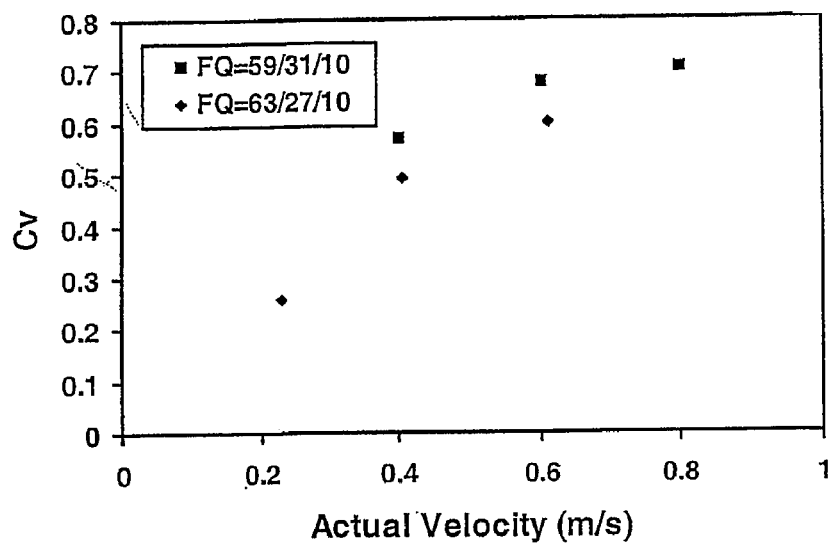
FIG. 4 is a plot of the venturi coefficient ($C_v$) versus the actual velocity (m/s) of the bitumen froth pumped through a pipeline in a meter performance test using a classical venturi meter.

The results are shown in FIG. 4 and show that:

1. at lower pipeline (hence, approach section) velocities, the $C_v$ is nowhere near ideal values (i.e., 0.974 as was shown with water); nor is it a constant at different velocities;

2. $C_v$ did not start to level off (i.e., approach a constant value) until the velocity in the approach section reached about 0.8 m/sec; this is likely due to a decrease in the accumulation of bitumen on the walls of the venturi meter at the higher velocities.

Flow meter performance tests were then conducted with an unheated flow meter of the present invention having a reduced diameter approach section. In these tests the pipeline inner diameter was 150 mm and the flow meter approach inner diameter is 78 mm. The bitumen froth quality is 67/24/9 (B/W/S, % by mass). Because of the reduced diameter of the approach section, the throat section of the flow meter was also less (i.e., about 51 mm) than in the first experiment which used a standard venturi meter.

In these tests the froth velocities in the approach section would be significantly higher than the froth velocity the pipeline due to the reduced diameter of the approach section. Further, the velocity in the throat section of the flow meter would also be significantly increased as a result of the reduced diameter of the approach section, as well as the reduced diameter of the throat itself. It was hypothesized that by increasing the velocity in the throat section of the venturi meter, bitumen accumulation on the walls of the meter would be reduced and a constant $C_v$ could be maintained.

Figure 5:
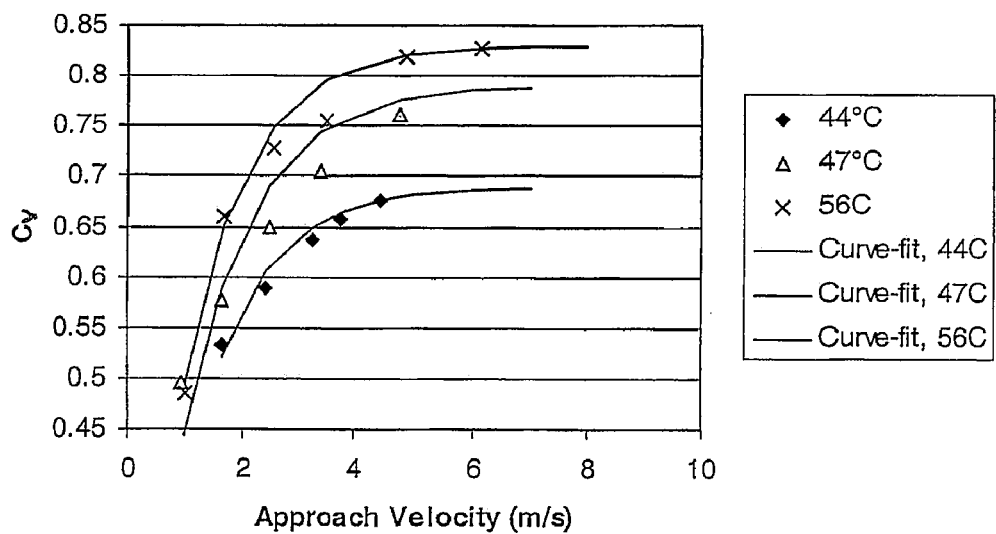
FIG. 5 is a plot of the venturi coefficient ($C_v$) versus the approach velocity (m/s) of the bitumen froth in a meter performance test using an embodiment of a flow meter device of the invention.

FIG. 5 is a plot of $C_v$ versus approach velocity (m/s). Three different temperatures of bitumen froth (froth quality is the same for each temperature, i.e., 67/24/9) were tested, namely, 44° C., 47° C. and 56° C. FIG. 5 illustrates that at each temperature, the $C_v$ started to level off (i.e., approach a constant value) much quicker as the approach velocity increased. Further, the range of $C_v$ was much less than in FIG. 4, which indicates that the goal of a constant $C_v$ is closer to being met when the approach section inner diameter is reduced.

In particular, when bitumen froth was at a temperature of 56° C., the $C_v$ levelled off very quickly and gave the highest $C_v$ values, i.e., approaching the ideal value of 0.98. Thus, when the froth temperature was at its highest and the approach section was reduced, the $C_v$ was much more constant at lower approach velocity and closer to ideal values.

EXAMPLE 2

Effect of Increasing Both Temperature and Velocity

Flow meter performance tests were conducted with a venturi meter of the present invention having a reduced diameter approach section (and thus a smaller throat section) and where the walls of the venturi meter were heated by heating the pipe wall to a temperature between 65-75° C. using a heated jacket. In these tests the pipeline inner diameter is 150 mm and the flow meter approach inner diameter is 78 mm. The bitumen froth quality is 67/24/9 (B/W/S, % by mass) and three separate froth temperatures were tested, namely, 44° C., 47° C. and 56° C.

Figure 6:
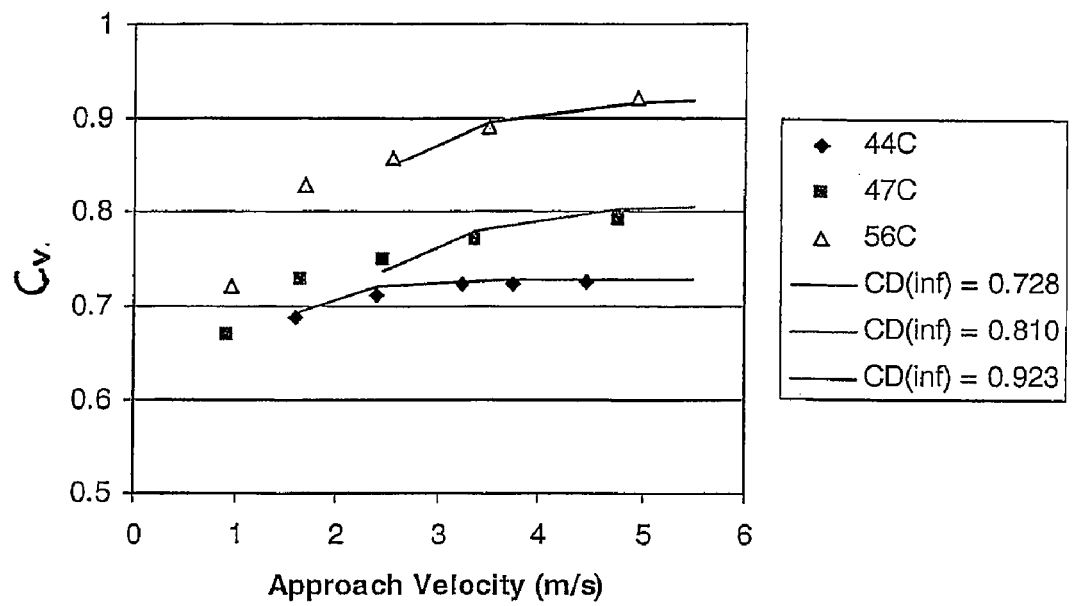
FIG. 6 is a plot of the venturi coefficient ($C_v$) versus the approach velocity (m/s) of the bitumen froth in a meter performance test using another embodiment of a flow meter device of the invention.

FIG. 6 is a plot of $C_v$ versus the approach velocity (m/s) and illustrates that when the venturi meter comprises a reduced diameter approach section (and thus a smaller throat section) and the venturi meter was heated, a fairly constant $C_v$ could be obtained at all approach velocities regardless of the temperature of the froth. Thus, even at low froth temperatures, which can often be the case in practice, the $C_v$ remains fairly constant.

Finally, the performance of a venturi meter of the present invention having a reduced diameter approach section (and thus a smaller throat section) where the walls of the venturi meter were heated by heating the pipe wall to a temperature between 65° C. was compared to a venturi meter having a reduced diameter approach section where the walls were at ambient temperature. In these tests the pipeline inner diameter was 150 mm and the flow meter approach inner diameter is 78 mm. The bitumen froth quality was 67/24/9 and the froth temperature was 47° C. Measured velocity was calculated assuming a constant venturi coefficient, $C_v$=0.810 (as extrapolated from FIG. 7) and using the equation:

$$\% \text{ error in measured velocity} = \frac{(\text{actual velocity} - \text{measured velocity})}{\text{actual velocity}} \times 100\%$$

Figure 7:
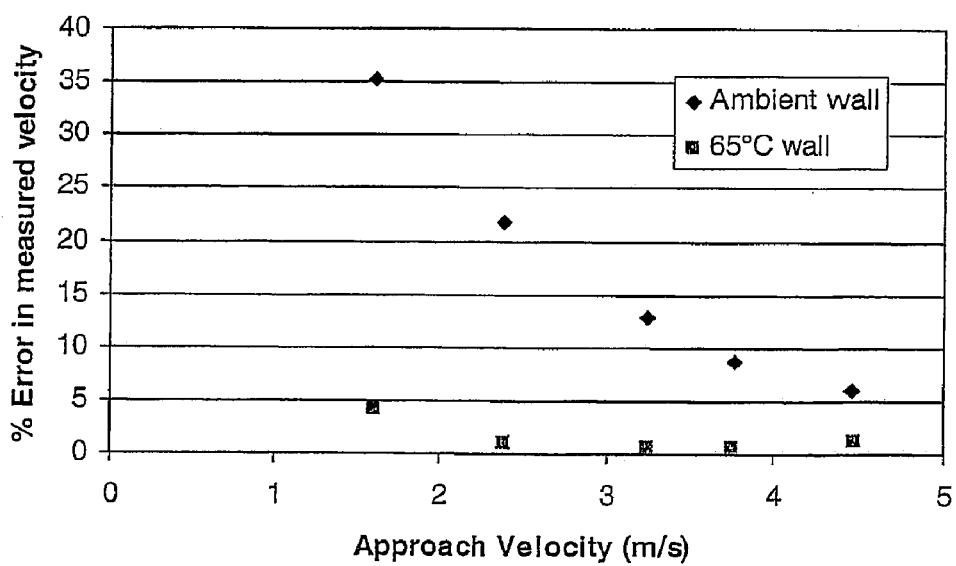
FIG. 7 is a plot of the % error in measured velocity versus the approach velocity (m/s) of the bitumen froth in a meter performance test using another embodiment of a flow meter device of the invention.

FIG. 7 is a plot of the % error in measured velocity versus the approach velocity (m/s). The plot clearly shows that when the venturi meter walls are heated to 65° C., the % error is significantly reduced over the entire range of velocities tested. This was not the case when the venturi meter walls were at ambient temperature.

In summary, with a small-throat (due to reduced approach section), heated-wall flow meter, the effect of velocity on venturi coefficient is essentially eliminated. Further, when using the small-throat, heated-wall flow meter, the venturi coefficients were found to vary linearly with froth temperature; thus the venturi coefficient (which is now independent of froth velocity) can be predicted as a function of froth temperature, and therefore the froth velocity can be accurately measured.

We claim:

1. A method for measuring the flow rate of a viscous fluid such as bitumen froth having a certain temperature through a pipeline having an inner diameter, comprising:

providing a conduit comprising an approach section and a venturi section having in series a converging section and a throat section, the converging section of the venturi section being disposed relative to the approach section and the throat section having an inner diameter less than the inner diameter of the approach section;

inserting the conduit into the pipeline or between two pieces of pipe comprising the pipeline;

allowing the viscous fluid to flow through the pipeline and through the conduit;

heating at least a portion of the conduit to a temperature of about the temperature of the viscous fluid or higher to reduce adherence of the viscous fluid to an inner wall of the conduit as it flows therethrough; and measuring the pressure difference $\Delta P$ between two points that are separate from one another in the flow direction, one point being on the approach section and the other point being on the throat section, to calculate the flow rate in the pipeline.

2. A method as claimed in claim 1, whereby the venturi section of the conduit further comprises a diverging section being disposed relative to the throat section.

3. A method as claimed in claim 1, whereby the conduit is heated by encasing the flow meter in an insulated heat-exchanging pipeline jacket.

4. A method as claimed in claim 1, whereby the conduit is heated by wrapping electrical heat tracing and insulation around at least the venturi section.

5. A method as claimed in claim 1, whereby when the conduit is inserted into the pipeline, the conduit is heated by heating the pipeline walls surrounding the conduit.

6. A method as claimed in claim 5, whereby the pipeline walls are heated by means of a heating jacket.

7. A method as claimed in claim 1, whereby the conduit is heated to a temperature in the range of about 35° C. to about 75° C.

8. A method as claimed in claim 1, whereby the conduit is heated to a temperature in the range of about 50° C. to about 75° C.

9. A method as claimed in claim 1, whereby, when the viscous fluid is flowing through the pipeline at a minimum velocity of about 0.5 m/sec, the inner diameter of the approach section is such that the viscous fluid velocity in the approach section is at least about 2 m/sec.

10. A method as claimed in claim 1, whereby the ratio of the inner diameter of the throat section to the inner diameter of the approach section is about 0.7.

11. A flow meter device for measuring the flow rate of a viscous fluid such as bitumen froth through a pipeline having an inner diameter, comprising:
a conduit comprising an approach section having an inner diameter less than the inner diameter of the pipeline and a venturi section having in series a converging section and a throat section, the converging section of the venturi section being disposed relative to the approach section and the throat section having an inner diameter less than the inner diameter of the approach section; and
a differential pressure measuring device for measuring the pressure difference ΔP between two points that are separate from one another in the flow direction, one point being on the approach section and the other point being on the throat section, whereby the pressure difference ΔP correlates to the flow rate of the viscous fluid through the pipeline.

12. A flow meter device as claimed in claim 11, wherein the venturi section further comprises a diverging section being disposed relative to the throat section.

13. A flow meter device as claimed in claim 11, further comprising a heating device for heating the conduit to reduce adherence of the viscous fluid to an inner wall of the conduit as it flows therethrough.

14. A flow meter device as claimed in claim 13, whereby the heating device comprises an insulated heat-exchanging jacket for encasing the conduit.

15. A flow meter device as claimed in claim 13, whereby the heating device comprises electrical heat tracing and insulation wrapped around the venturi section.

16. A flow meter device as claimed in claim 11, whereby the inner diameter of the approach section is such that the viscous fluid velocity in the approach section is 2 m/sec or greater at a minimum pipeline operating velocity of about 0.5 m/sec.

17. A flow meter device as claimed in claim 11, whereby the ratio of the inner diameter of the throat section to the inner diameter of the approach section is about 0.7.

18. A flow meter device as claimed in claim 11, wherein the free end of the approach section further comprises means for attaching the approach section to a pipe section and the free end of the throat section further comprises means for attaching the throat section to another pipe section.

19. A flow meter as claimed in claim 12, wherein the free end of the approach section further comprises means for attaching the approach section to a pipe section and the free end of the diverging section further comprises means for attaching the diverging section to another pipe section.

20. A method as claimed in claim 1, wherein the approach section has an inner diameter less than the inner diameter of the pipeline.

21. A flow meter device for measuring the flow rate of a viscous fluid through a pipeline having an inner diameter, comprising:
a conduit comprising an approach section and a venturi section having in series a converging section and a throat section, the converging section of the venturi section being disposed relative to the approach section and the throat section having an inner diameter less than the inner diameter of the approach section;
a differential pressure measuring device for measuring the pressure difference ΔP between two points that are separate from one another in the flow direction, one point being on the approach section and the other point being on the throat section; and
a heating device for heating the conduit to reduce adherence of the viscous fluid to an inner wall of the conduit as the viscous fluid flows therethrough;
whereby the pressure difference ΔP correlates to the flow rate of the viscous fluid through the pipeline.

22. A flow meter device as claimed in claim 21, wherein the venturi section further comprises a diverging section being disposed relative to the throat section.

23. A flow meter device as claimed in claim 21, whereby the heating device comprises an insulated heat-exchanging jacket for encasing the conduit.

24. A flow meter device as claimed in claim 21, whereby the heating device comprises electrical heat tracing and insulation wrapped around the venturi section.

25. A method for measuring the flow rate of a viscous fluid through a pipeline having an inner diameter, comprising:
providing a conduit comprising an approach section having an inner diameter less than the inner diameter of the pipeline and a venturi section having in series a converging section and a throat section, the converging section of the venturi section being disposed relative to the approach section and the throat section having an inner diameter less than the inner diameter of the approach section;
inserting the conduit into the pipeline or between two pieces of pipe comprising the pipeline;
allowing the viscous fluid to flow through the pipeline and through the approach section of the conduit to increase the velocity of the viscous fluid; and
measuring the pressure difference ΔP between two points that are separate from one another in the flow direction, one point being on the approach section and the other point being on the throat section, to calculate the flow rate in the pipeline.

26. The method as claimed in claim 25, whereby the venturi section further comprises a diverging section being disposed relative to the throat section.

* * * * *